(12) United States Patent
Baumann et al.

(10) Patent No.: US 11,788,595 B2
(45) Date of Patent: Oct. 17, 2023

(54) MACHINE ASSEMBLY, IN PARTICULAR A TIDAL POWER PLANT

(71) Applicant: AKTIEBOLAGET SKF, Gothenburg (SE)

(72) Inventors: Michael Baumann, Gädheim (DE); Matthias Hofmann, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 120 days.

(21) Appl. No.: 17/167,455

(22) Filed: Feb. 4, 2021

(65) Prior Publication Data

US 2021/0254683 A1 Aug. 19, 2021

(30) Foreign Application Priority Data

Feb. 14, 2020 (DE) ......................... 102020201875.8

(51) Int. Cl.
*F16D 69/02* (2006.01)
*F03B 11/00* (2006.01)

(52) U.S. Cl.
CPC .......... *F16D 69/027* (2013.01); *F03B 11/006* (2013.01); *F16D 69/026* (2013.01); *F05B 2260/4023* (2013.01)

(58) Field of Classification Search
CPC ...... F03B 13/26; F03B 13/264; F03B 11/006; F03B 11/00; F03B 3/128; F05B 2260/4023; F05B 2220/32; F05B 2240/61; F05B 2240/70; F05B 2260/30; F16D 65/127; F16D 69/026; F16D 69/027; F16D 2220/0017; F16D 2250/0046; F16D 1/033; F16D 2300/08; Y02E 10/20; Y02E 10/30;
(Continued)

(56) References Cited

U.S. PATENT DOCUMENTS 3,724,613 A * 4/1973 Bermingham ........ F16D 69/027
188/218 XL
6,347,905 B1 * 2/2002 Lukschandel ........... F16B 2/005
403/404
(Continued)

FOREIGN PATENT DOCUMENTS

DE 102011085612 A1 5/2013
DE 102017223353 A1 6/2019
(Continued)

OTHER PUBLICATIONS

Search Report from the British Patent Office dispatched Jun. 30, 2021 in related application No. GB2100606.9.

*Primary Examiner* — Robert A. Siconolfi
*Assistant Examiner* — San M Aung
(74) *Attorney, Agent, or Firm* — J-TEK LAW PLLC; Scott T. Wakeman; Mark A. Ussai

(57) ABSTRACT

A machine assembly includes a first machine component and a second machine component, the first machine component including a first installation surface and the second machine component including a second installation surface. The first and second installation surfaces are mounted against one another in the assembly. A friction-increasing element is provided in the assembly between the first installation surface and the second installation surface. Further, in the assembled state, a sealing material is introduced into an intermediate space between the first and second installation surfaces.

16 Claims, 2 Drawing Sheets

(58) Field of Classification Search
CPC ..... Y02E 10/28; Y02E 10/223; Y02E 10/226; F16B 2/005
USPC .................................................... 188/251 M
See application file for complete search history.

(56) References Cited

U.S. PATENT DOCUMENTS

| | | | | |
|---|---|---|---|---|
| 6,465,110 | B1 * | 10/2002 | Boss | G10K 11/162 |
| | | | | 428/605 |
| 2015/0053517 | A1 * | 2/2015 | Arbesman | F16D 69/0408 |
| | | | | 188/251 A |
| 2019/0323529 | A1 * | 10/2019 | Grimm | F16B 2/005 |

FOREIGN PATENT DOCUMENTS

| | | | | |
|---|---|---|---|---|
| EP | 2773864 | B1 | 8/2017 | |
| WO | 2013064385 | A1 | 5/2013 | |
| WO | WO-2014155523 | A1 * | 10/2014 | .............. B25J 18/00 |

\* cited by examiner

MACHINE ASSEMBLY, IN PARTICULAR A TIDAL POWER PLANT

CROSS-REFERENCE

This application claims priority to German Patent Application No. DE 102020201875.8, filed on Feb. 14, 2020 the entire contents of which are fully incorporated herein by reference.

BACKGROUND OF THE INVENTION

The present invention relates to a machine assembly including a first machine component and a second machine component that are attached to each other via a friction-increasing element. In particular, such a machine assembly is preferably a tidal power plant or a part thereof.

In tidal power plants, a rotor shaft is usually fixedly screwed by means of a flange connection to a rotor hub that carries rotor blades. In such applications, the flange positions the two mechanical components, in this case the rotor shaft and the rotor hub, against each other and is configured to transmit operating forces, i.e., torque. For this purpose, the two flange elements are usually screwed to each other. With a screw-connection alone, for example, in tidal power plants where torque is to be transmitted between the rotor hub and the rotor shaft, no rotationally fixed connection can be produced, since a certain tolerance must be present between screw and hole, which in turn leads to a backlash in the direction of rotation.

In order to ensure that a rotationally secure connection exists between two components, i.e., a connection such that they rotate together without relative movement or is free of force-transmission loss, it is known from the prior art to dispose a friction-increasing element between the flange elements so that, not only a force-fit, but also a friction-fit connection exists.

A friction disc or a friction lacquer, for example, may be used as the friction-increasing element between the two flange surfaces. In such cases, hard particles, such as for example, diamond, are provided on the friction disc or in the friction lacquer, such hard particles press in or embed within the surfaces to be connected to each other and thus connect the two components to each other in a friction-fit manner so that a force-fit and friction-fit connection arises. The intermediate friction-increasing element thus prevents backlash, so that a rotationally-fixed connection is provided between the components.

However, when used in tidal power plants that necessarily operate under water, it has been found that seawater penetrating between the flanges causes the friction lacquer to be removed or the hard particles to be detached from the friction disc and flushed out. However, this phenomena may also be observed not only in tidal power plants, but also in land applications wherein, for example, high humidity or heavy rain may cause the hard particles to be washed out.

SUMMARY OF THE INVENTION

It is therefore an object of the present invention to provide a connection between a first component and a second component that makes possible a rotationally secure connection between the two components even under unfavorable environmental conditions, such as, for example, under water. As used herein, the term "rotationally secure" comprises rotational and translational movements.

In the present invention, a machine assembly includes a first machine component and a second machine component, wherein the first machine component includes a first installation surface and the second machine component includes a second installation surface, the two installation surfaces being mounted against each other in the assembly. In such cases, the machine components are usually releasably attached to each other. In order to provide a rotationally-secure connection between the first machine component and the second machine component, a friction-increasing element is also disposed between the first assembly surface and the second assembly surface. This friction-increasing element allows the assembly surfaces to be attachable or connectable to each other such that they rotate together. For this purpose, the friction-increasing element preferably includes hard particles, such as, for example, diamond, titanium boride, tungsten carbide, and/or silicon carbide. These hard particles are configured to interlock with the installation or assembly surfaces and to thereby provide a friction fit between the installation surfaces. The friction fit in turn ensures the rotationally-secure connection between the components.

In general, in the following a "rotationally secure connection" is understood to mean a rotational but also a translational movement-securing. However, since in the relevant applications rotational movements mostly occur in such connections, the term "rotationally secure" is used. However, the property described herein can also be used with all translational or combined movements.

In order to prevent a releasing or removal of the hard particles from the friction-increasing element even in difficult environmental conditions, such as, for example, under water or in damp climates, in an assembled state, a sealing material is provided in an intermediate space between first and second assembly or installation surfaces. Such sealing material is preferably disposed or located such that it seals the intermediate space toward or from an external environment. The sealing material is thereby capable of preventing water from entering into the intermediate space and the hard particles from releasing or detaching from the friction-increasing element and washing out. Furthermore, the addition of a sealing material provides an inexpensive means, also subsequently installable during maintenance work, for sealing the intermediate space between the installation surfaces.

Here it is advantageous in particular to arrange the sealing material circumferentially around the entire perimeter of the friction-increasing element so that the intermediate space is sealed from all sides with respect to the external environment. Such an arrangement of the seal material is particularly advantageous in underwater applications.

However, in land-based applications it is also possible to dispose or apply the sealing material only partially on the machine component, for example, only in a direction from which a water entry is expected.

According to a further advantageous exemplary embodiment, the sealing material is preferably formed from a liquid, curable seal composition (i.e., seal material applied in a liquid state and subsequently hardens). Such a sealing material can be easily introduced into the intermediate space and distributed around the friction-increasing element in the intermediate space so that the intermediate space is particularly well sealed.

Other seals or sealing materials may alternatively be used, such as, for example, an O-ring. However, during the installation of the components, for example, when screwing together the flanges, these seal elements must be held in place, which makes the installation more difficult. On the other hand, the liquid seal composition can be easily applied to one or both installation surfaces and cured after the assembly/the installation, so that it is ensured that the entire intermediate space is sealed outward (i.e., prevents external substances from entering the intermediate space). In such a liquid seal application, during screwing together or assembly, the liquid sealing material preferably presses into the existing seal gaps, cures there and thus ensures an optimal seal protection.

According to a further advantageous exemplary embodiment, the friction-increasing element is a friction disc that is disposed between the first and second machine components. Such friction discs can be disposed loosely between the two components (i.e., not attached to either component), but it is also possible to attach the friction disc to one of the first and second components before the installation or assembly of the components. Friction discs have the advantage that they can be prefabricated such that no extra processing step, for example, a coating, is necessary in order to dispose or place the friction-increasing element on one or both of the machine components. In addition, friction discs can be easily exchanged or replaced during maintenance work, and a friction disc with a robust diamond coating may be reused multiple times. The advantageous use of a liquid sealing material makes possible a simple installability and removability. After the maintenance work the liquid sealing material can then be reapplied and thus ensures a cost-effective sealing.

Alternatively or additionally, the friction-increasing element may be a friction lacquer or a friction coating that is applied to the first and/or second installation surface. Such coatings can also be used in addition to a friction disc in order to increase friction. Such coatings or lacquers can be applied during the manufacturing of either or both of the two components, which makes possible a particularly simple and rapid installation.

According to a further advantageous exemplary embodiment, the friction-increasing element includes hard-material particles, preferably formed of diamond, titanium boride, tungsten carbide, and/or silicon carbide. Such hard-material particles are particularly suitable to interlock with the installation surfaces in order to thus provide a rotationally secure connection between the two components.

It is furthermore advantageous when the hard-material particles are applied to the friction disc or to the installation surface by a coating that protects against corrosion, in particular, preferably a wetting nickel coating. The machine assembly and/or the friction disc can thereby additionally be protected from corrosion, which in turn increases the service life of the machine assembly. In addition, the nickel coating can ensure the embedding of the hard-material particles and thus the solid adhesion to the carrier material.

According to a further advantageous exemplary embodiment, the machine assembly is a tidal or current power plant that is completely surrounded by (i.e., immersed in) salt water or fresh water. Especially in tidal and current power plants that operate under water, a sealing of the friction-increasing element with respect to an external environment is particularly important, since in underwater operation, the friction particles may become released from the friction disc and flushed from the intermediate space between the two components. The friction disc or the friction-increasing element thereby loses its micro-interference fit or its interlocking to the adjacent surfaces, such that the two components of the machine assembly are no longer attached to each other in a rotationally secure manner. Thus, the sealing material protects the friction-increasing element from the entry of water, so that a flushing out and releasing of the friction particles can no longer occur.

Providing such a seal is particularly preferred in an exemplary embodiment in which the first machine component is a rotor shaft and the second machine component is a rotor hub. Both components are elements that are freely accessible, i.e., are not received in a housing, and are thus directly exposed to the environmental influences, such as, for example, water. A further advantage is that marine life cannot adhere into/onto the mating surfaces or enter therein over time. Furthermore, torque generated by the turbine blades is reliably transmitted via the connection between the rotor shaft and the rotor hub, so that relatively large forces may act or be transferred without losses due to backlash in the connection between the shaft and the hub.

Further advantages and advantageous embodiments are specified in the description, the drawings, and the claims. Here in particular the combinations of features specified in the description and in the drawings are purely exemplary, so that the features can also be present individually or combined in other ways.

BRIEF DESCRIPTION OF THE SEVERAL VIEWS OF THE DRAWING

In the following, the invention is described in more detail using the exemplary embodiments depicted in the drawings. Here the exemplary embodiments and the combinations shown in the exemplary embodiments are purely exemplary and are not intended to define or limit the scope of the invention. This scope is defined solely by the pending claims.

DETAILED DESCRIPTION OF THE INVENTION

In the following, identical or functionally equivalent elements are designated by the same reference numbers.

Figure 1:
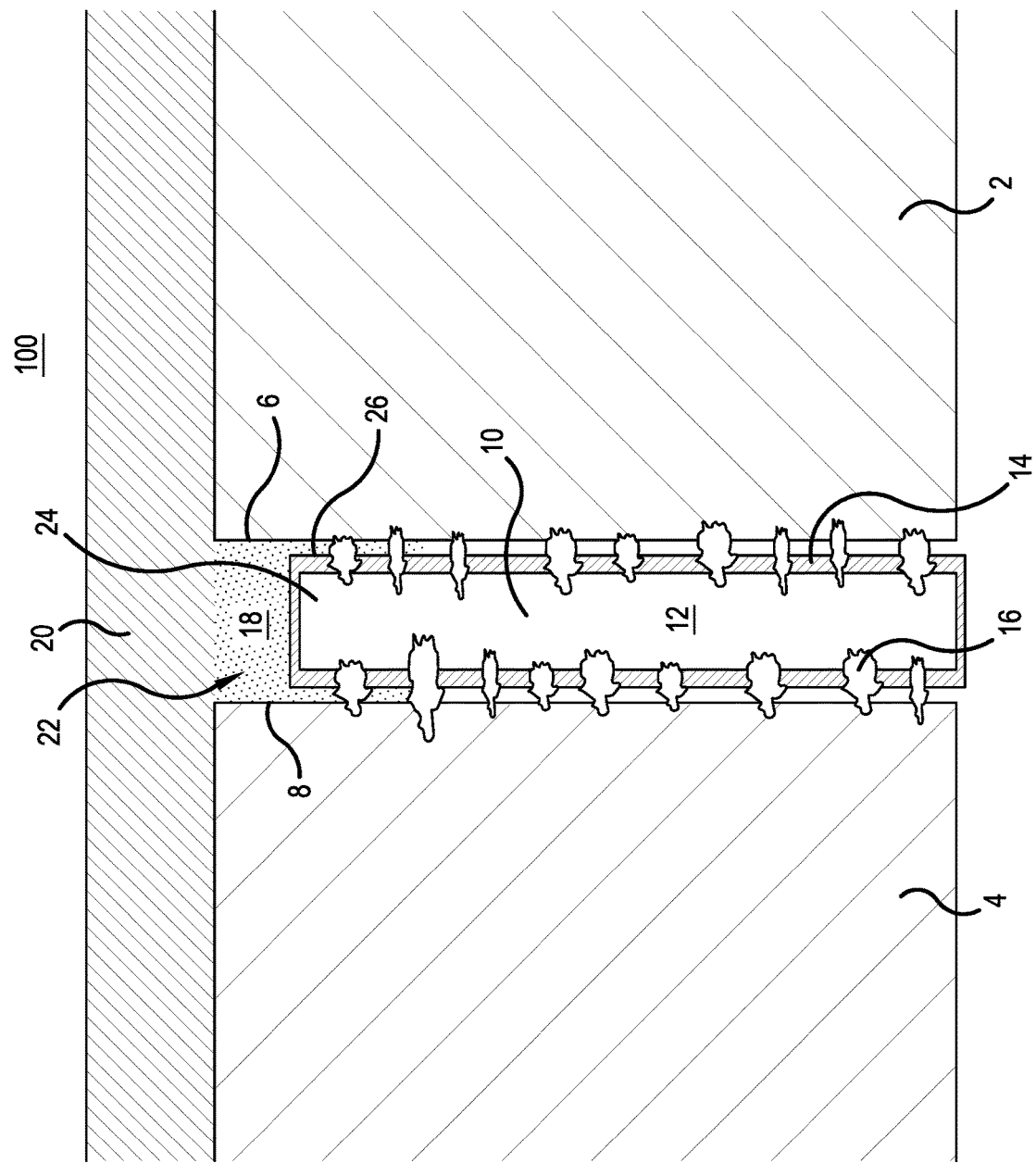
FIG. 1 shows a schematic sectional view through a machine assembly according to the invention.

FIG. 1 schematically shows a section through a machine assembly 100, which includes a first component 2 and a second component 4. The first component 2 and the second component 4 each include an installation surface 6, 8, respectively, that are facing one another and that must be connected to each other in the assembly 100 in a rotationally secure manner. For such a rotationally secure connection, a friction-increasing element 10, which in this case is configured as a friction disc, is disposed between the first and second components 2, 4. The friction disc 10 typically includes a steel core 12, which in turn is coated with a corrosion coating 14, which is preferably formed of nickel. Hard material particles 16, for example, diamond, titanium boride, tungsten carbide, and/or silicon carbide are preferably introduced into the nickel layer 14. Such hard material particles 16 ensure a rough surface (i.e., with a relatively high friction coefficient) and make possible an interlocking between the friction disc 10 and the assembly surfaces 6, 8 of the components 2, 4, respectively.

Figure 2:
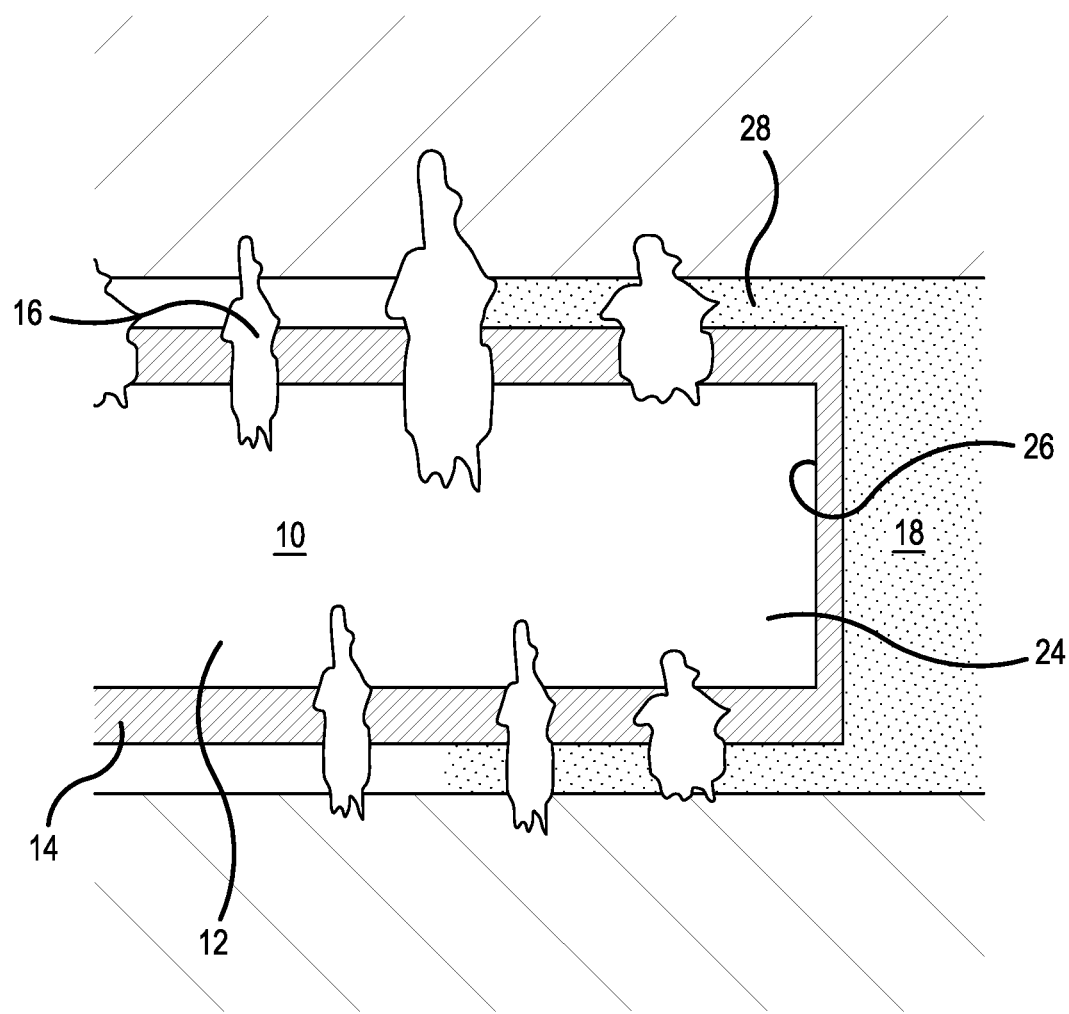
FIG. 2 shows a detailed view of the machine assembly of FIG. 1.

As can also be seen in the enlarged view of FIG. 2, the hard-material particles 16 press into the friction disc 10 both in the assembly surfaces 8 or 6 of the components 2, 4 and through the nickel coating 14. An interlocking/micro-interference fit between the components 2, 4 and the friction disc 10 is thereby achieved, which in turn ensures a rotationally secure connection between the components 2, 4 and the friction disc 10.

In addition to or instead of an additional component, such as, for example, the friction disc 10, it is also possible to apply a friction lacquer or a friction coating to the installation surfaces 6, 8 of the components 2, 4. Such friction lacquer or friction coating also contains hard particles that directly interlock with the installation surfaces 6, 8. However, providing a friction disc 10 has the advantage that friction discs 10 can be easily exchanged or changed during maintenance. Although coatings may be applied directly during the manufacturing to the installation surfaces 6, 8 and enable rapid installation, a replacement or a repair of the coating is, however, difficult and labor-intensive. Of course, it is also possible to combine or utilize both a friction coating and a friction disc.

As furthermore depicted in FIG. 1, an intermediate space 18 is present between the first and second components 2, 4, which intermediate space 18 is due to, or created by the presence of, the friction-increasing element 10. That is, due to the element 10, the components 2, 4 do not abut directly against each other, but are instead spaced from each other, even if minimally. However, such a spacing would also be present in principle in all elements attached to one another since there are not any ideally or perfectly smooth abutting surfaces.

However, such intermediate space(s) 18 are problematic in applications of the assembly 100 involving difficult or harsh environmental conditions, such as for example, in underwater applications. In particular with underwater applications, water 20 surrounds the components 2, 4 and can penetrate into the intermediate space 18. Apart from corrosion problems, any water 20 entering the space 18 may cause a release the friction particles 16 from the friction disc 10 or from a friction lacquer. These released particles 16 are then flushed out of the intermediate space 18, so that the friction-increasing element 10 no longer has a friction-fit with the assembly installation surfaces 6, 8.

It is therefore proposed to seal the intermediate space 18, wherein a sealing material 22 is preferably introduced into the intermediate space 18, such sealing material 22 being distributed in the intermediate space 18, preferably circumferentially about the entire perimeter of the disc 10, and seals the friction disc 10 from the external environment, in particular from the water 20. In principle, it would also be possible to arrange an O-ring around the friction disc 10, but such an O-ring may impede the installation and may act like a spacer element, so that the interlocking of the friction disc 10 with the assembly installation surfaces 6, 8 cannot occur to a sufficient or necessary extent.

It is therefore proposed to introduce a liquid sealing material 22 that is optimally distributed in the intermediate space 18 and cures or hardens after installation, so that it can be ensured that the friction-increasing element 10 is sealed with respect to the external environment 20. In addition, the liquid sealing material 22 may also flow around the hard particles and thus additionally secure the particles in position. It can thereby be ensured that both the intermediate space 18 and the friction-increasing element 10 are sealed with respect to an external environment 20 and the hard particles 16 are optimally interlocked with or secured to the assembly installation surfaces 6, 8.

In particular, a liquid adhesive may be used as the liquid sealing material 22. For example, metal adhesives may be used that serve as a liquid seal for securing screws or other fasteners. In particular, silicon-based liquid seals are particularly preferred for the sealing material 22. Such sealing materials are usually paste-like and may be applied, prior to the assembly, around or about the friction-increasing element 10, on one of the two assembly surfaces 6, 8 and/or an end surface 24 of the friction disc 10 using a tube or cartridge.

During the assembly, the liquid-seal material 22 is then pressed in about the end surface 24 or the outer end 26 of the seal disc into the intermediate space 18 and also between the hard particles 16. The liquid-seal material 22 is distributed in the intermediate space 18 between the end 24 of the friction disc 10 and the external environment 20. Since the liquid-seal material 22 is distributed in the existing intermediate spaces during assembling when the components 2, 4 are tightened, it can be ensured that no undesired spacer impairs the interlocking of the friction particles 16 with the installation surfaces 6 and 8 and the friction disc 10. In addition, by means of the distribution of the liquid sealing material 22, the entire intermediate space 18 may be sealed with respect to the outer region 20, such that the entry of water into the space 18 is thus reliably prevented.

In particular, with tidal power plants or underwater turbines that operate under water (salt or fresh water), such a sealing of a flange connection between a rotor shaft and a rotor hub having a friction-increasing element disposed therebetween is particularly preferred. The entry of saltwater or seawater may cause the friction coating of the friction disc to wash off, whereupon the friction disc loses its friction-generating capacity. On the other hand, a wetting of the friction disc with a liquid seal material has no influence on the friction capacity of the friction disc. Quite to the contrary, since the liquid seal material or liquid adhesive is distributed around the hard particles themselves during assembly, and during screwing together or pressing in which the hard particles press through the sealing material so that the micro-interference fit remains ensured, the hard particles are additionally fixed in their position and protected from penetrating water.

Overall, using the proposed solution, a cost-effective seal can be provided for connecting points between two components. In particular with operating conditions in a moist or wet environment, or under water, the friction disc or the friction-increasing element can be safely protected from being washed-out by means of the sealing material. In addition, such seals can also be easily retrofitted in existing flange connections. Even during the maintenance the provided seal is not obstructive, since it is easily scraped off and newly applied. In this way, friction discs can also be easily exchanged and resealed.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A machine assembly comprising:
   a first machine component including a first installation surface;
   a second machine component including a second installation surface mounted against the first installation surface;
   a friction-increasing element provided between the first installation surface and the second installation surface; and
   a sealing material introduced into an intermediate space between the first installation surface and the second installation surface and circumferentially about an entire perimeter of the first and second machine components and the friction-increasing element, the sealing material being formed as a liquid seal composition applied as a liquid to at least one of the first and second installation surfaces and/or the friction-increasing element and cured after assembly of the first and second machine components such that the liquid sealing material bonds to both installation surfaces and flows into any seal gaps in the assembly prior to curing.

2. The machine assembly according to claim 1, wherein the sealing material is disposed such that the friction-increasing element located between the first installation surface and the second installation surface is protected by the sealing material from an external environment of the machine assembly.

3. The machine assembly according to claim 1, wherein the friction-increasing element is a friction disc disposed between the first machine component and the second machine component, the friction disc being loose or attached.

4. The machine assembly according to claim 1, wherein the friction-increasing element is a friction lacquer or a friction coating, the lacquer or coating being applied to the first installation surface and/or the second installation surface.

5. The machine assembly according to claim 1, wherein the friction-increasing element includes hard material particles.

6. The machine assembly according to claim 5 wherein the hard material particles include at least one of diamond, titanium boride, tungsten carbide and silicon carbide.

7. The machine assembly according to claim 5, wherein the hard material particles are applied to the friction disc, to the first installation surface and/or to the second installation surface by a corrosion-protecting coating.

8. The machine assembly as recited in claim 7 wherein the corrosion-protecting coating is a nickel coating.

9. The machine assembly according to claim 1, wherein the machine assembly is a tidal power plant or a current power plant that is completely surrounded by salt water or fresh water.

10. The machine assembly according to claim 7, wherein the first machine component is a rotor shaft and the second machine component is a rotor hub.

11. A machine assembly comprising:
    a first machine component including a first installation surface;
    a second machine component connected with the first machine component and including a second installation surface facing the first installation surface;
    a friction-increasing element disposed between the first installation surface and the second installation surface; and
    a sealing material disposed within an intermediate space between the first installation surface and the second installation surface and circumferentially about an entire perimeter of the first and second machine components and the friction-increasing element, the sealing material being configured to seal the friction-increasing element from an external environment of the machine assembly and being formed from a liquid seal composition applied as a liquid into the intermediate space after assembly of the first and second machine components and then cured such that the liquid sealing material bonds to both installation surfaces and flows into any seal gaps in the assembly prior to curing.

12. The machine assembly according to claim 11, wherein the friction-increasing element is a friction disc disposed between the first machine component and the second machine component.

13. The machine assembly according to claim 11, wherein the friction-increasing element is a friction lacquer or a friction coating, the lacquer or coating being applied to the first installation surface and/or the second installation surface.

14. The machine assembly according to claim 11, wherein the friction-increasing element includes hard material particles.

15. The machine assembly according to claim 14, wherein the hard material particles include at least one of diamond, titanium boride, tungsten carbide and silicon carbide.

16. The machine assembly according to claim 14, wherein the hard material particles are applied to at least one of the friction disc, the first installation surface and the second installation surface by a corrosion-protecting coating.

* * * * *